United States Patent
Thalakkal Kottilaveedu et al.

(10) Patent No.: US 9,047,188 B2
(45) Date of Patent: Jun. 2, 2015

(54) STATE MACHINE BASED PARSING ALGORITHM ON A DATA-STATUS FIFO WITH MULTIPLE BANKS

(71) Applicant: Texas Instruments Incorporated, Dallas, TX (US)

(72) Inventors: Pratheesh Gangadhar Thalakkal Kottilaveedu, Bangalore (IN); Kanad D. Kanhere, Irving, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/046,048

(22) Filed: Oct. 4, 2013

(65) Prior Publication Data

US 2014/0101496 A1    Apr. 10, 2014

Related U.S. Application Data

(60) Provisional application No. 61/709,382, filed on Oct. 4, 2012.

(51) Int. Cl.
*G06F 3/00* (2006.01)
*G06F 11/07* (2006.01)

(52) U.S. Cl.
CPC .................. *G06F 11/0745* (2013.01)

(58) Field of Classification Search
USPC .............................................. 710/1
See application file for complete search history.

(56) References Cited

U.S. PATENT DOCUMENTS

| | | | | |
|---|---|---|---|---|
| 5,781,803 | A * | 7/1998 | Krakirian | 710/74 |
| 7,535,844 | B1 * | 5/2009 | Gulstone | 370/236 |
| 2012/0310515 | A1 * | 12/2012 | Kirshon et al. | 701/112 |

* cited by examiner

*Primary Examiner* — Chun-Kuan Lee
(74) *Attorney, Agent, or Firm* — Robert D. Marshall, Jr.; Frank D. Cimino

(57) ABSTRACT

In the L2 FIFO architecture incoming frames are stored in a multi bank FIFO to enable offloading the programmable real-time unit to do other tasks. The L2 FIFO buffers data coming from the L1 FIFO, reducing the polling time for received data. Status is always checked for errors before processing the data and updating the state variables. Implementing a state machine to perform some of the checks results in a PRU utilization that is not a function of the bytes that need to be processed.

3 Claims, 1 Drawing Sheet

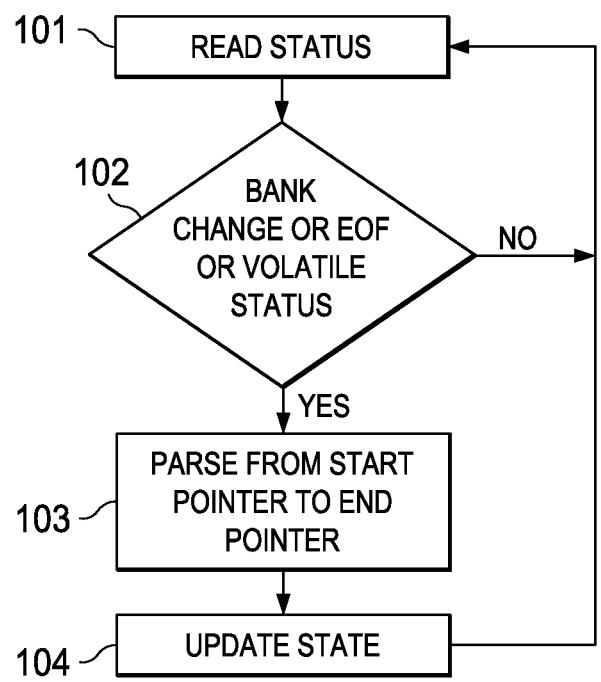

STATE MACHINE BASED PARSING ALGORITHM ON A DATA-STATUS FIFO WITH MULTIPLE BANKS

CLAIM OF PRIORITY

This application claims priority under 35 U.S.C. 119(e)(1) to Provisional Application No. 61709382 filed 4 Oct. 2012.

TECHNICAL FIELD OF THE INVENTION

The technical field of this invention is L2 FIFO architecture.

BACKGROUND OF THE INVENTION

Incoming frames are stored in RXL2 FIFO which is composed of 2 banks. L2 FIFO enables offloading of PRU (Programmable Real-Time Unit: real-time non-preemptive RISC core) to do other tasks by buffering 16-bit data (8-bit at a time) from L1 FIFO. Hence instead of polling every 160 ns (16-bit) for received data, we can poll every 2.56 us (32*8*10).

Each bank has 32 bytes of data, 16 bytes of status and a 5-bit write pointer. There is one status entry per two bytes. The write pointer gives the info about data entry being written. First 8 registers in the bank hold data and next 4 registers has corresponding status.

A status can be volatile or static. A volatile status is one which is not yet complete, and hence can not be parsed.

The parser task might be required to start parsing in the middle of the FIFO based on where it left parsing in the previous run.

The frames are packed contiguously. The buffer does not switch on each EOF.

SUMMARY OF THE INVENTION

Efficient parsing of packets using an L2 FIFO hooked to MII interface of ICSS which has 2 banks of data and status (32 and 16 bytes/bank respectively) and non-interleaved. Status informs the parser about SOF/SFD/EOF/Errors etc.

BRIEF DESCRIPTION OF THE DRAWINGS

These and other aspects of this invention are illustrated in the drawing, in which:
The FIG. 1 shows a flow chart of novel parsing method of the invention.

DETAILED DESCRIPTION OF PREFERRED EMBODIMENTS

Always check status for errors/SOF/EOF, before processing data and updating state variables below. This is mandatory to update error counters etc—advantage with the state machine approach is that PRU utilization is not a function of number of bytes to process. There are states in which we can even skip XIN of new data. For example: SKIP_TILL_EOF, SKIP_PAD_BYTES etc. We spend cycles only when needed and below mentioned variables should be sufficient to save parser context.

State: SOF state_length: 1 read_bytes, fifo_status (last_read_bank, bytes) NextState: SKIP_ADDRESS
State: SKIP_ADDRESS state_length: 12 bytes read_bytes, fifo_status (last_read_bank, bytes) NextState: EthercatType
State: EthercatType state_length: 2 bytes read_bytes, fifo_status (last_read_bank, bytes) NextState: EthercatFrameHeader or SKIP_TILL_EOF
State: EthercatFrameHeader state length: 2 read_bytes, fifo_status (last_read_bank, bytes) NextState: EthercatDataGram or SKIP_TILL_EOF
State: EthercatDataGram state_length: n read_bytes, fifo_status (last_read_bank, bytes) NextState: EthercatDataGram, SKIP_PAD_BYTES, SKIP_TILL_EOF//In this state read Command, Address and Length and More bit. Skip remaining bytes

| | |
|---|---|
| State: SKIP_TILL_EOF | NextState: EOF |
| State: SKIP_PAD_BYTES | NextState: EOF |
| State: EOF | NextState: SOF |
| State: ERROR | NextState: SOF |

In one implementation of the invention:
The frame parsing code parses one byte at a time.
Macros/functions are written to parse the status and then return a byte.
These bytes are returned from internal registers except for when there is a bank change required, in which case the new data is XINed first and then returned.
Every new state frame parser code stores the code pointer, in case it's done with parsing somewhere in the middle.
Accordingly the per byte the code has to do following checks:
1. Have MAX_BYTES_TO_BE_PARSED_IN_A_TASK (which is 32 for us) already been parsed?
2. Does the status have EOF asserted? If yes then branch to relevant part of frame parser code.
3. Check if status is ready i.e. status is static.
4. Increment the number of bytes parsed count.
5. Increment the data byte pointer
6. Increment the status byte pointer.
7. Check if bank change required.

Analysis of the above implementation:
The above steps are the least number of cycles spent per byte. Additionally bank change, if done, requires 6 cycles.
In the above steps each step is a cycle except for step 6 which takes 3 cycles (because status pointer should be incremented only once in two bytes). Thus the number of cycles used for 32 byte plain parsing, assuming a bank change once= (9*32+6)*5=1.470 uS.
The above cycles are just for status parsing. We can assume additionally 2 cycles per byte for data parsing (for task initialization, for code pointer storage once in a while, for loop counter increments, for task end etc). This is 2*32*5=320 ns.
Additionally scheduler overhead for context save and restore is 175 ns.
Thus the average frame parse time=1.47+0.32+0.175=1.965 uS.
This number doesn't account for EOF calculations because that is once in a while activity for good frames. But in the worst case of every frame being 2 bytes long, the EOF operation has to be done very frequently, which bumps up this number to ~2.4 uS.
An alternate and preferable implementation is as follows:
As the first approach shown necessitates byte level parsing, it is very slow. To make it fast, the approach should be to parse status in jumps of two bytes wherever possible. But this mandates that frame parsing code be implemented as SW state machine.

This approach is as follows:
1. A piece of code keeps parsing the status, until it encounters bank change, EOF or a volatile status.
2. When it encounters any of the three above mentioned, it passes the start data pointer and the end data pointer to the frame parsing state machine, which consumes the data and updates the state accordingly, and returns to step 1.

This is shown in the Figure, where status is read in block 101. Parser 102 looks for EOF, Bank change or a Volatile status. If not found, control returns to block 101. When found, state machine 103 continues parsing from the start pointer to the end pointer, and updates the state in block 104. When the end pointer is reached, control returns to block 101 to continue parsing.

By this approach, a single byte status parse is only required if EOF is asserted at odd byte location. Otherwise status is parsed for 2 bytes at a time.

Analysis of the second implementation:

By this approach, a single byte status parse is only required if EOF is asserted at odd byte location. Otherwise status is parsed for 2 bytes at a time.

Cycle numbers for this approach are
Odd byte plain—7
Odd byte with bank change—16+FRAME_PROC_TIME
Odd byte with task done—2
Odd byte with bank change and task done—13+FRAME_PROC_TIME
Even two bytes plain—8
Even two bytes with EOF at odd—15+FRAME_PROC_TIME+EOF_PROC_TIME (only one byte parsed)
Even two bytes with EOF at even—17+FRAME_PROC_TIME+EOF_PROC_TIME
Even two bytes with bank change—17+FRAME_PROC_TIME
Even two bytes with EOF at even and bank change—24+FRAME_PROC_TIME+EOF_PROC_TIME
Even two bytes with task done—6+FRAME_PROC_TIME
Even two bytes with EOF at odd and task done—16+FRAME_PROC_TIME+EOF_PROC_TIME (only one byte parsed)
Even two bytes with EOF at even and task done—18+FRAME_PROC_TIME+EOF_PROC_TIME
Even two bytes with EOF at even, bank change and task done—21+FRAME_PROC_TIME+EOF_PROC_TIME Cycle numbers for this approach are
Odd byte plain—7
Odd byte with bank change—16+FRAME_PROC_TIME
Odd byte with task done—2
Odd byte with bank change and task done—13+FRAME_PROC_TIME
Even two bytes plain—8
Even two bytes with EOF at odd—14+FRAME_PROC_TIME+EOF_PROC_TIME (only one byte parsed)
Even two bytes with EOF at even—16+FRAME_PROC_TIME+EOF_PROC_TIME
Even two bytes with bank change—17+FRAME_PROC_TIME
Even two bytes with EOF at even and bank change—23+FRAME_PROC_TIME+EOF_PROC_TIME
Even two bytes with task done—6+FRAME_PROC_TIME
Even two bytes with EOF at odd and task done—15+FRAME_PROC_TIME+EOF_PROC_TIME (only one byte parsed)
Even two bytes with EOF at even and task done—17+FRAME_PROC_TIME+EOF_PROC_TIME
Even two bytes with EOF at even, bank change and task done—20+FRAME_PROC_TIME+EOF_PROC_TIME
From this profile numbers and QT profiling, typical frame parsing time is 1.3 us/bank with worst case ~1.6 us/bank.

What is claimed is:

1. A method of parsing status data comprising the steps of:
parsing status data until a bank change status is found,
passing a start data pointer and an end data pointer to a parsing state machine,
parsing frame data by the parsing state machine from the start data pointer and updating applicable states,
exiting the parsing state machine when the end data pointer is reached.

2. The method of parsing status data of claim 1 wherein:
said step of parsing status data includes parsing status data until an EOF status is found.

3. The method of parsing status data of claim 1 wherein:
said step of parsing status data includes parsing status data until a volatile status is found.

* * * * *